June 13, 1939.   C. S. WOOLFORD   2,161,839
SOLDER WIPER
Filed July 6, 1936   2 Sheets-Sheet 1

INVENTOR
Custis S. Woolford
BY
Ivan W. Thornburgh
Charles H. Cruz
ATTORNEYS

June 13, 1939.  C. S. WOOLFORD  2,161,839
SOLDER WIPER
Filed July 6, 1936   2 Sheets-Sheet 2
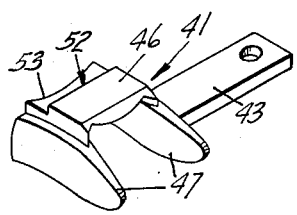
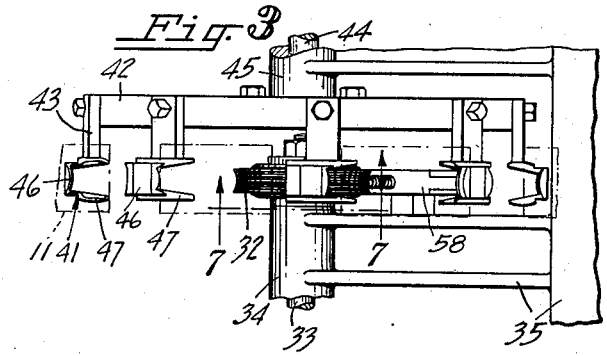
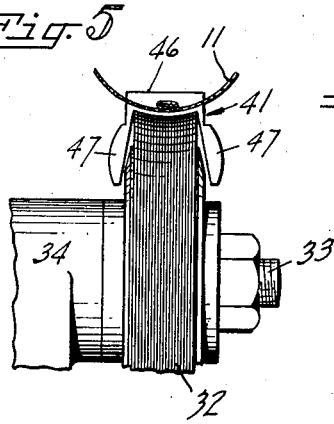
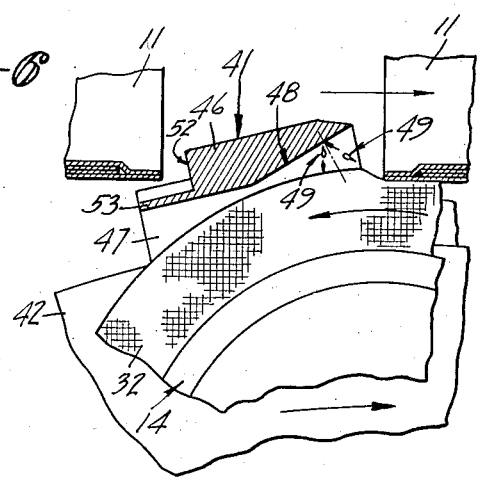
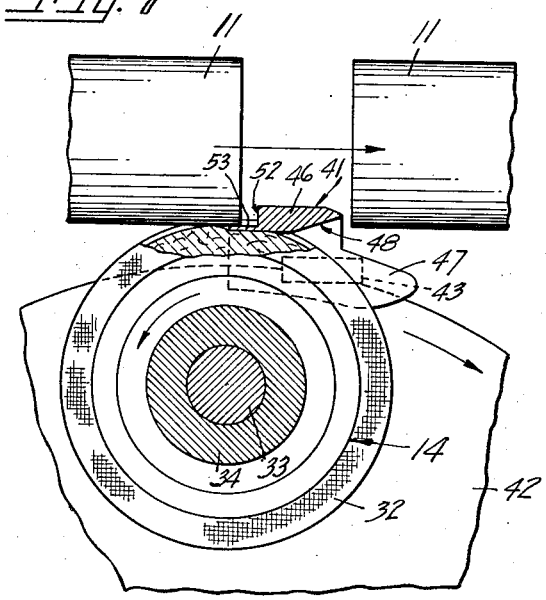
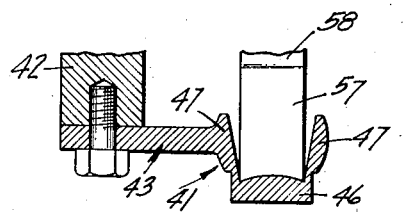
INVENTOR
Custis S. Woolford
BY
ATTORNEYS Patented June 13, 1939

2,161,839

UNITED STATES PATENT OFFICE 2,161,839

SOLDER WIPER

Custis S. Woolford, South Orange, N. J., assignor to American Can Company, New York, N. Y., a corporation of New Jersey Application July 6, 1936, Serial No. 89,187

10 Claims. (Cl. 113—97)

The present invention relates to solder wiper mechanism for can body side seam soldering machines and has particular reference to devices for covering or shielding the solder wiper just prior to and at the end of a body side seam wiping operation to prevent entrance into the body of solder pellets or other foreign matter which may be thrown off by the wiper, the devices also guarding the forward edge of the body against digging into the wiper, and thereby preventing spattering of solder from the wiper. The invention relates to that type of solder wiper mechanism disclosed in United States Patent 1,985,906 issued January 1, 1935, to H. F. Smith on Solder wiper.

An object of the invention is the provision of a device for a solder wiper of a can body side seam soldering machine, wherein the device shields the wiper by covering it on sides and top in such a manner as to prevent solder pellets or other foreign matter thrown from the sides or top of the wiper from entering the interior of the can body at the beginning of a wiping operation, the shield also acting to control the direction of travel of matter thrown from the wiper at the end of a wiping operation so that the foreign matter is directed back onto the wiper and hence prevented from entering the rear open end of the body.

Another object is the provision of such a device for a solder wiper, wherein the device shields the forward end edge of a can body to be wiped so that body and wiper are brought together beyond the forward edge of the body thereby preventing the body edge from digging into the wiper and preventing spattering of solder pellets into the can body, this feature also minimizing excessive wear of the wiper and prolonging its usefulness.

Still another object is the provision of a device of this character which engages the wiper and reshapes it into proper form after a solder wiping operation so that the wiper will be prevented from mushrooming and will always be kept in proper condition for the wiping of a succeeding can body.

A further object is the provision of such a device in which solder pellets which are caught by it are scraped off before a subsequent shielding action so that the shield will always be free from foreign matter and unobstructed when it again comes into shielding position.

Numerous other objects and advantages of the invention will be apparent as it is better understood from the following description, which, taken in connection with the accompanying drawings, discloses a preferred embodiment thereof.

Referring to the drawings:

Fig. 3 is a top plan view of the solder wiping device as viewed substantially along a plane indicated by the line 3—3 in Fig. 1, parts being broken away;

Fig. 4 is an enlarged perspective view of one of the shields of the wiping device;

Fig. 5 is an enlarged transverse elevational detail as viewed substantially along a plane indicated by the line 5—5 in Fig. 1, parts being broken away;

Fig. 6 is a side elevational detail on a still larger scale showing one of the shields in section and in a position to prevent solder thrown off by the wiper from entering a wiped can body, parts of two can bodies being shown in section;

Fig. 7 is a similar view on a smaller scale showing can bodies in a slightly advanced position, this view being virtually a section taken substantially along the line 7—7 in Fig. 3; and Fig. 8 is an enlarged sectional detail taken substantially along the line 8—8 in Fig. 1.

Figure 1:
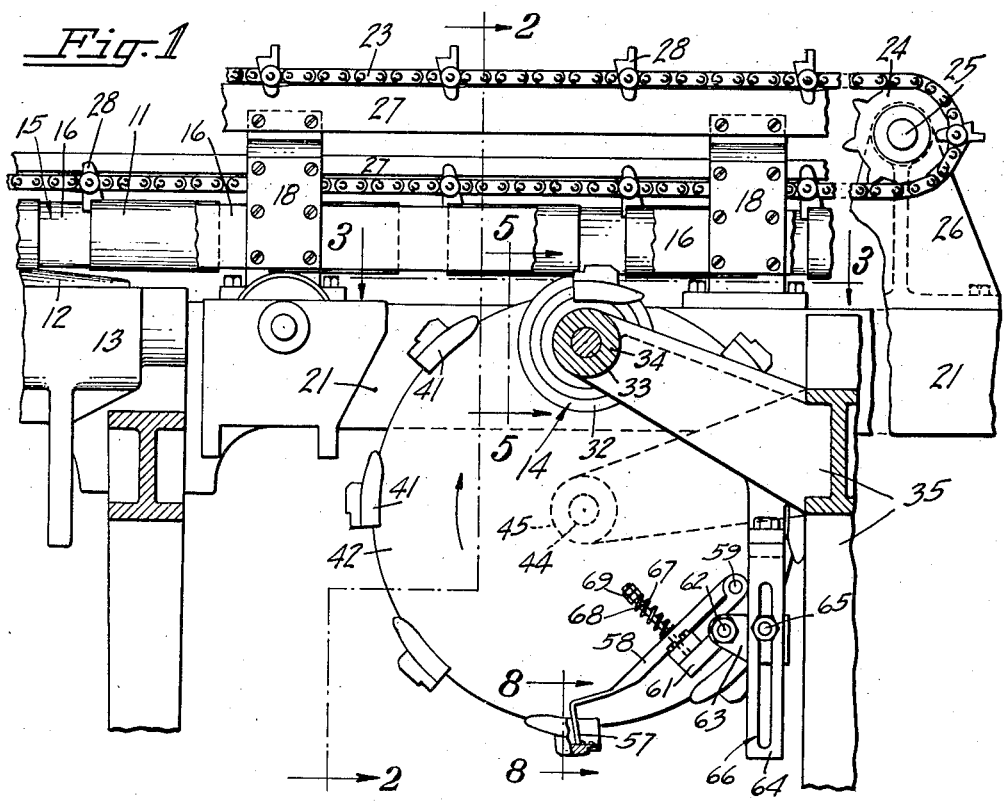
Figure 1 is a side elevation of the wiper section of a soldering machine embodying the instant invention, parts of the machine being broken away and other parts shown in section.
Figure 2:
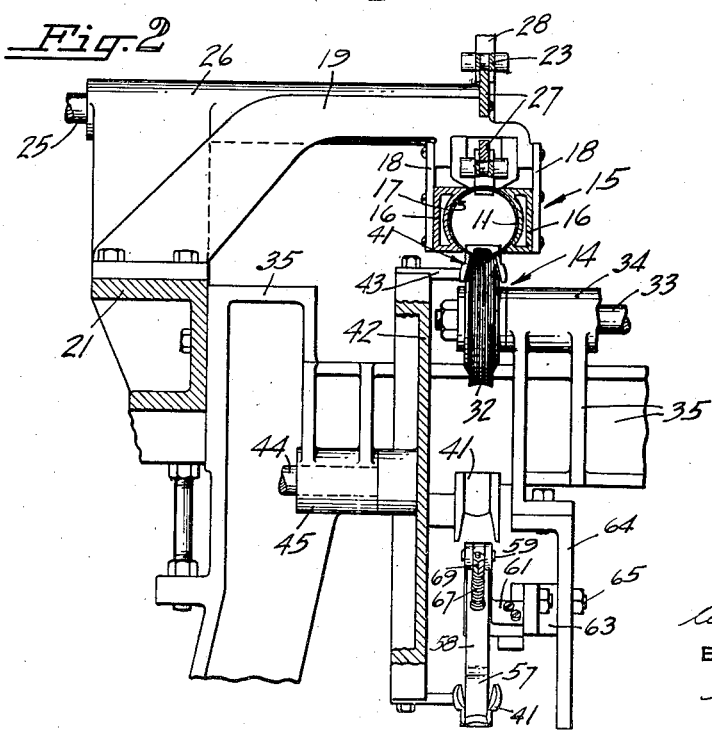
Fig. 2 is a transverse section taken substantially along the broken line 2—2 in Fig. 1.

As a preferred embodiment of the invention the drawings illustrate the wiper section of a can soldering machine in which open end can bodies 11 (Fig. 1) are first soldered along their side seams by a suitable soldering mechanism such as, for example, a usual solder roll 12 which is rotated in any suitable manner in a solder bath 13. The can bodies are conveyed in a straight line longitudinally of the solder roller and past a solder wiper 14 where excess solder on the seams is wiped off. During this passage of the bodies they are supported in a suitable horn 15 (Fig. 2).

The drawings illustrate a horn 15 of standard construction which comprises a pair of spaced and parallel hollow guide bars 16 having curved inner faces 17 which support the can bodies 11 while at the same time maintaining the roundness of the bodies. The horn bars 16 are secured to side plates 18 which are bolted to overhanging brackets 19 mounted on a main frame 21 of the soldering machine. There are a plurality of these brackets 19 disposed at spaced intervals along the length of the machine.

The soldered can bodies 11 are moved along the horn 15 past the solder wiper 14 by a continuously moving endless chain conveyor 23 (Figs. 1 and 2) which extends the full length of the machine and is actuated in any suitable manner. At the wiper end of the machine the chain takes over an idler sprocket 24 which is mounted on a shaft 25 carried in a bracket 26 bolted to the top of the main frame 21.

The conveyor chain is suitably supported between the sprockets on runways 27 which are bolted to the overhanging brackets 19. Feed dogs 28 secured to the chain at equally spaced intervals along its length engage behind the rear edge of the can bodies 11 and move them along the horn in spaced relation as shown in Figs. 1, 6 and 7 so that their soldered seams are brought into contact with the solder wiper 14.

The solder wiper 14 is of the usual construction of cloth wiper wheel 32 (Figs. 1, 2, 3 and 4) and is mounted on a horizontal shaft 33 journaled in a bearing 34 formed in a bracket 35 which is bolted to the side of the main frame 21. The wheel is rapidly rotated in any suitable manner in a direction opposite to that of the travel of the bodies along the horn. When a body is moved past the wiper the cloth wheel engages against the body side seam and wipes away any loose or soft solder adhering thereto. It is this solder which may be thrown off the rapidly turning wheel, especially when the wheel becomes loaded, and such catapulted solder may enter the interior of the bodies if no protection is provided.

In the instant invention the solder is prevented from entering the can bodies by a shield 41 (Figs. 1, 2, 3 and 4) which is interposed in the space between adjacent can bodies and which covers the wiper wheel as one body moves away from the wheel and a following body approaches it. There are a plurality of these shields 41 carried by a disc 42 and equally spaced around its periphery. Each shield is formed at one end of an arm 43 which is bolted to the disc.

The disc 43 is mounted on a horizontal shaft 44 which is journaled in a bearing 45 formed in the bracket 35. The disc is continuously rotated in any suitable manner in synchronism with the travel of the bodies 11 along the horn 15. This rotation brings each shield 41 into position at the proper time as shown in Figs. 6 and 7.

Each shield 41 comprises a top bridge member 46 having depending spaced parallel side wings 47 (Figs. 4 and 5) formed integrally therewith. The bridge member when brought into shielding position extends into the space between the bodies while the wings extend down adjacent the sides of the wiper thereby covering it at top and sides.

The inner face (marked 48) of the bridge 46 is inclined at its forward end to catch pellets 49 of solder or other foreign matter and to prevent their entering an approaching or a receding body as the wiping operation on the latter nears its end and as the shield 41 is being brought into position as shown in Fig. 6. The angle of inclination of the inner face of the forward end of the bridge 46 is such as to cause any solder pellet 49 when striking against it to be deflected away from the rear end of the can body leaving the wiper, the angle of incidence with the normal causing the solder to be thrown back onto the wiper. Thus the direction of travel of the thrown off solder pellets is controlled to prevent their entrance into the interior of a body leaving the wiper.

The rear end of the bridge 46 is cut away to form a step 52 and to provide a thinned portion 53 of the bridge which overlaps the forward edge of an approaching body when brought into position as shown in Fig. 7. This part of the bridge serves as a guide or guard element which causes the wiper to first engage the body beyond its forward edge when body and wiper are brought together. This prevents the forward edge of the body from digging into the wiper and also prevents the wiper from spattering solder into the interior of the body. This adds considerably to the useful life of the wiper, as excessive wearing has always resulted from the digging in of the relatively sharp can body edge. In the present instance this is avoided.

The wiping action of the cloth wiper 32 against the passing bodies 11 tends to mushroom or spread out the contacting surface of the wiper and this mushrooming is aggravated when the wiper becomes loaded or filled with collected solder. This undesirable condition of the wiper is prevented by the depending side wings 47 of the shields 41. The side wings 47 are flared slightly, enough to clear the usual cloth holding washers which hold the wiper discs together. The peripheral edge of the wiper at this place as it enters between the side plates is compressed and this action reforms the wiper as the latter rotates, and in this manner, the wiper is always kept in proper form to effect an efficient wiping operation.

Pellets of solder which may adhere to the inclined inner face 48 of the shields 41 are removed by a scraper 57 (Figs. 1, 2 and 8) after a shielding action as they are carried around with the rotating disc 42. The scraper is formed on the free end of an arm 58 mounted on a pivot pin 59 carried in a bracket 61. Bracket 61 is secured by a bolt 62 to an auxiliary bracket 63. This auxiliary bracket is slidably attached to a stationary support 64 by a bolt 65 which passes through a vertical slot 66 formed in the support. Support 64 is bolted to the bracket 35.

This construction provides for vertical as well as pivotal adjustment of the scraper 57 so that the latter may be located in a desired position for obtaining a proper scraping action on the inner surface 48 of the shields as they pass by.

Provision is made for yieldingly holding the scraper 57 against the surface 48 of a passing shield so as to insure a scraping contact. This is effected by a compression spring 67 which bears down on the arm 58. The spring is held on a rod 68 one end of which is threaded into the bracket 61. Its opposite end is provided with adjustable lock-nuts 69 which confine the spring on the rod and which may be utilized to adjust the compression of the spring.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A solder wiping mechanism for soldering machines, comprising feeding devices for advancing a can body having a soldered side seam along a line of travel, a wiper located adjacent said line of travel and having engagement with the side seam of said passing can body during its advancement for wiping its soldered seam section, a shield for covering said wiper to prevent the entrance into the interior of said passing can body of solder and other foreign matter thrown from said wiper, and having side wings formed thereon and extending adjacent opposite sides of said wiper for catching the foreign matter thrown off by the wiper, said side wings also engaging against the sides of said wiper to reform it for the wiping operation and to protect it against mushrooming.

2. A solder wiping mechanism for soldering machines, comprising feeding devices for advancing a can body having a soldered side seam along a line of travel, a wiper located adjacent said line of travel and having engagement with the side seam of the said passing can body as it is being advanced for wiping its soldered seam section, a shield for covering said wiper to prevent the entrance into the interior of said passing can body of solder and other foreign matter thrown from said wiper, and a scraper for removing such solder and foreign matter which may collect on said shield.

3. A solder wiping mechanism for soldering machines, comprising feeding devices for advancing a can body having a soldered side seam along a line of travel, a wiper located adjacent said line of travel and having engagement with the side seam of the said passing can body as it is being advanced for wiping its soldered seam section, a shield for covering said wiper to prevent the entrance into the interior of said passing can body of solder and other foreign matter thrown from said wiper, and a scraper yieldably engaging said shield for removing such solder and foreign matter which may collect on said shield.

4. A solder wiping mechanism for soldering machines, comprising feeding devices for advancing can bodies having soldered side seams along a line of travel and in spaced relation, a wiper located adjacent said line of travel and having engagement with the side seams of said passing can bodies during their advancement for wiping their soldered seam sections, a plurality of shields for said wiper, and means for interposing said shields into the spaces between adjacent passing can bodies and over the top of said wiper to prevent foreign matter thrown off by said wiper from entering the interior of the bodies.

5. A solder wiping mechanism for soldering machines, comprising feeding devices for advancing can bodies having soldered side seams along a line of travel and in spaced relation, a wiper located adjacent said line of travel and having engagement with the side seams of said passing can bodies during their advancement for wiping their soldered seam sections, a plurality of shields for said wiper, and means for interposing said shields into the spaces between adjacent passing can bodies and over the top of said wiper to prevent foreign matter thrown off by said wiper from entering the interior of the bodies, said interposed shields acting to deflect said catapulted solder in a direction away from the interior of one of said adjacent can bodies and also acting to guard the front end of the side seam of the other of said adjacent can bodies to prevent spattering of solder into the interior thereof from said wiper.

6. A solder wiping mechanism for soldering machines, comprising feeding devices for advancing a can body having a soldered side seam along a line of travel, said feeding devices being disposed above the path of travel of the can body, a wiper located adjacent said line of travel and having engagement with the side seam of the said passing can body as it is being advanced for wiping its soldered seam section, and means for shielding said wiper to prevent throwing of solder and other foreign matter into the interior of said passing can body, said shielding means having devices whereby it is moved in a vertical plane in a rotary path substantially tangential to and spaced below the axial line of travel of the can body.

7. A solder wiping mechanism for soldering machines, comprising feeding devices for advancing can bodies having soldered side seams along a line of travel, said feeding devices being disposed above the path of travel of the can body, a wiper located adjacent said line of travel and having engagement with the side seams of said passing can bodies during their advancement for wiping their soldered seam sections, means for shielding said wiper to prevent throwing of solder and other foreign matter into said passing can bodies, and a guard element associated with said shielding means for blocking off the front end of the side seam of each can body during the wiping action to prevent spattering of the solder on the wiper into the interior of the bodies, said shielding means having devices whereby it is moved in a vertical plane in a rotary path substantially tangential to and spaced below the axial line of travel of the can body.

8. A solder wiping mechanism for soldering machines, comprising feeding devices for advancing a can body having a soldered side seam along a line of travel, a wiper located adjacent said line of travel and having engagement with the side seam of the said passing can body as it is being advanced for wiping its soldered seam section, and means for guarding the front end of the side seam at the beginning of the wiping action to prevent the end of said side seam from digging into said wiper and thereby throwing of solder and other foreign matter into the interior of said passing can body, said guarding means having devices whereby it is moved in a vertical plane below the longitudinal axis of the advancing can bodies.

9. A solder wiping mechanism for soldering machines, comprising feeding devices for advancing a can body having a soldered side seam along a line of travel, a wiper located adjacent said line of travel and having engagement with the side seam of the said passing can body as it is being advanced for wiping its soldered seam section, a shield for covering said wiper and having portions depending over opposite sides thereof to prevent the entrance into the interior of said passing can body of solder and other foreign matter thrown from said wiper, said shield having a portion inclined at an angle to the normal plane thereof for deflecting said catapulted solder and directing the same away from said can body interior.

10. A solder wiping mechanism for soldering machines, comprising feeding devices for advancing can bodies having soldered side seams along a line of travel, a wiper located adjacent said line of travel and having engagement with the side seams of said passing can bodies during their advancement for wiping their soldered seam sections, and a plurality of means moving in time with the travel of said bodies, and in a vertical plane below the longitudinal axis of the advancing can bodies for shielding said wiper to prevent the entrance into the interior of said passing can bodies of solder and other foreign matter thrown from said wiper.

CURTIS S. WOOLFORD.